US008843516B2

(12) United States Patent
Leong et al.

(10) Patent No.: US 8,843,516 B2
(45) Date of Patent: Sep. 23, 2014

(54) INTERNET SECURITY

(75) Inventors: Chik Weng Leong, Kuala Lumpur (MY); Ying Chyn Ng, Kuala Lumpur (MY); Chee Hoo Lau, Kuala Lumpur (MY)

(73) Assignee: E-Lock Corporation SDN. BHD., Kuala Lumpur (MY)

( * ) Notice: Subject to any disclaimer, the term of this patent is extended or adjusted under 35 U.S.C. 154(b) by 1152 days.

(21) Appl. No.: 11/417,090

(22) Filed: May 3, 2006

(65) Prior Publication Data

US 2006/0253446 A1    Nov. 9, 2006

(30) Foreign Application Priority Data

May 3, 2005 (MY) .............................. PI 20051966

(51) Int. Cl.
*G06F 17/30* (2006.01)
*H04L 29/06* (2006.01)

(52) U.S. Cl.
CPC ...... *G06F 17/30867* (2013.01); *H04L 63/1441* (2013.01); *G06F 2221/2119* (2013.01); *H04L 63/1483* (2013.01)
USPC ............................. 707/770; 707/769; 707/782

(58) Field of Classification Search
None
See application file for complete search history.

(56) References Cited

U.S. PATENT DOCUMENTS

| 6,345,361 | B1 * | 2/2002 | Jerger et al. ................... 726/3 |
| 6,732,149 | B1 * | 5/2004 | Kephart ...................... 709/206 |
| 7,100,049 | B2 * | 8/2006 | Gasparini et al. ............. 713/170 |
| 7,334,254 | B1 * | 2/2008 | Boydstun et al. ................. 726/2 |
| 2001/0054064 | A1 * | 12/2001 | Kannan ......................... 709/203 |
| 2002/0128981 | A1 * | 9/2002 | Kawan et al. .................... 705/67 |
| 2004/0019595 | A1 * | 1/2004 | Bhogal et al. .................... 707/10 |
| 2004/0117615 | A1 * | 6/2004 | O'Donnell et al. ............. 713/155 |
| 2005/0172229 | A1 * | 8/2005 | Reno et al. ..................... 715/700 |
| 2006/0053293 | A1 * | 3/2006 | Zager et al. .................... 713/176 |
| 2006/0059544 | A1 * | 3/2006 | Guthrie et al. .................... 726/4 |
| 2006/0101120 | A1 * | 5/2006 | Helsper et al. ................ 709/206 |
| 2006/0101334 | A1 * | 5/2006 | Liao et al. ...................... 715/523 |
| 2006/0123478 | A1 * | 6/2006 | Rehfuss et al. ................... 726/22 |

OTHER PUBLICATIONS

Ollmann, G., The Phishing Guide; Understanding & Preventing Phishing Attacks, White papers—the latest thinking from NGS, Sep. 22, 2004, (retrieved on Apr. 22, 2008).
Japanese Office Action mailed Aug. 3, 2010 in respect of corresponding Japanese Application No. 2005-280778.
English translation of Japanese Office Action.
Citation 1, "Prepare for phishing!", *Network World*, Japan.
Citation 2, Filtering and preventing information leaks, *Nikkei Internet Technology*, Japan.
Japanese associate's comments on the Japanese Office Action and proposed amendments.
Australian Office Action mailed Sep. 29, 2010 in respect of corresponding Australian Application No. 2006200688.
Japanese Decision of Rejection mailed Nov. 24, 2000 in respect of corresponding Japanese Application No. 2005-280778 with English translation.
Japanese Decision of Rejection Mailed May 10, 2011 in Japanese Application No. 2005-280778 with English Translation.

* cited by examiner

*Primary Examiner* — Pierre Vital
*Assistant Examiner* — Andalib Lodhi
(74) *Attorney, Agent, or Firm* — Ladas & Parry LLP

(57) ABSTRACT

Redirection of user entered data to an unauthenticated website ("phishing") is checked by, at redirection, detecting the presence of data entry fields in a user web page and, if any are present, authenticating the redirection address against lists of approved websites or the redirection web site certificate. If the new address is not authenticated, the user may still opt to be redirected.

20 Claims, 2 Drawing Sheets

INTERNET SECURITY

BACKGROUND OF THE INVENTION

1. Technical Field

The invention generally relates to protecting the data a user enters on the internet. More particularly the invention relates to protecting data entered on the internet and preventing it being sent to unexpected locations, a technique known as "phishing."

2. Background Art

"Phishing" refers to the process of tricking or socially engineering an organisation's customers into imparting their confidential electronic identity for nefarious use. Phishing is a serious threat to any online business and service because it leads to unauthorised information access, fraud, and financial loss.

The person performing such an act is generally referred to as a "phisher." In general, the phisher will impersonate a trusted source so that the victim will be led to affirmatively perform a series of actions that will provide access to confidential information.

Common phishing techniques include tricking users into keying in fraudulent web addresses, or clicking on web links embedded in a fraudulent email, or manipulating DNS (domain name service) information. The aforementioned techniques will eventually cause web browsers to display fraudulent web content set up by the phishers. The fraudulent web content could take the form of a look-alike web page to a genuine web page, or fraudulent data input fields embedded into a genuine web page, or a pop-up window appearing on top of the original website.

The ultimate objective is to lead the users into believing that the data entry fields presented are genuine and hence into submitting confidential information to the phishers. Regardless of the technique deployed, the fraudulent web content will always contain data input fields for the web users to fill in and submit. The submitted data is typically confidential information such as login names and passwords, which will allow the phishers to exploit the electronic identities of their victims.

Known anti-phishing methods are either ineffective against the ever innovative phishing techniques or simply too costly for large scale deployment. Anti-phishing methods based on website bookmarks are ineffective against fraudulent web links on fake emails, or a fraudulent login page embedded into a genuine web page using a cross-site scripting method. Anti-phishing methods based on blacklists are unable to cope with the rapidly increasing fraudulent websites. Hardware token-based authentication methods are very costly for mass distribution.

The present invention provides a solution to this and other problems that offers advantages over the prior art.

SUMMARY OF THE INVENTION

In one preferred embodiment, the invention provides a method of controlling the submission of user-entered information in a web browser comprising:

detecting when the user attempts to navigate to a different web address;

detecting data entry fields in the currently displayed page; and where such fields exist:

verifying that the different web address is either in an approved list of web addresses, or is a secure site in which the site certificate corresponds with the site address, and allowing the transmission of the different web address if the verification is authenticated.

Preferably, if the verification is not authenticated, the user is queried for verification.

Preferably, the user may add different web addresses to the approved list of web addresses.

Preferably, the approved list of web addresses may be made up of one or more of a user-approved list, an embedded approved list, or a web-based approved list.

Preferably, the web-based approved list is a list available from a secure server.

Preferably, the secure site is a site using the Secure Sockets Layer (SSL) protocol.

Preferably, the data entry fields are detected in the current web page by detecting web form fields of the text type.

Preferably, there are degrees of authentication and the degree is indicated to the user by color indication.

In another preferred embodiment, the invention provides a web browser address authenticator including:

a web browser;

a web browser plug-in, the plug-in adapted to intercept any request to view a web page differing from the current web page, analysing the current web page for data entry fields and, if any are detected, comparing the requested web page address with authenticated addresses, and allowing transmission of the request to view only if the web page address is an authenticated address.

Preferably, the authenticated addresses are held in lists and at least one list is embedded in the plug-in.

Preferably, the authenticator indicates its active presence in the browser by displaying a toolbar.

Preferably the toolbar indicates the status of current requests.

In another preferred embodiment, the invention provides a web browser plug-in including:

an interceptor that intercepts any request to view a web page differing from the current web page; and an analyser that analyses the current web page for data entry fields and, if any are detected, compares the requested web page address with authenticated addresses, wherein if data entry fields are present, and the requested web page address matches an authenticated address, the plug-in allows the request.

Preferably, if the address is not authenticated the plug-in queries the user for verification.

Preferably, the address authentication is carried out on at least one of an address list internal to the plug-in, an address list associated with the browser, or an address list available from a web server.

Preferably, the plug-in interacts with the user via a browser toolbar.

In another preferred embodiment, the invention provides a computer readable medium including instructions that are operable to control an internet browser to:

detect when the user attempts to navigate to a different web address;

detect data entry fields in the currently displayed page; and where such fields exist:

verify that the different web address is either in an approved list of web addresses, or is a secure site in which the site certificate corresponds with the site address; and allow the transmission of the different web address if the verification is authenticated.

Preferably, the instructions are present in the form of a browser plug-in.

These and other features and advantages of the present invention will be apparent upon reading the following detailed description and reviewing the associated drawings.

This invention is an anti-phishing process that makes use of a combination of website authentication and data submission interception.

DETAILED DESCRIPTION OF THE PREFERRED EMBODIMENTS

Figure 1:
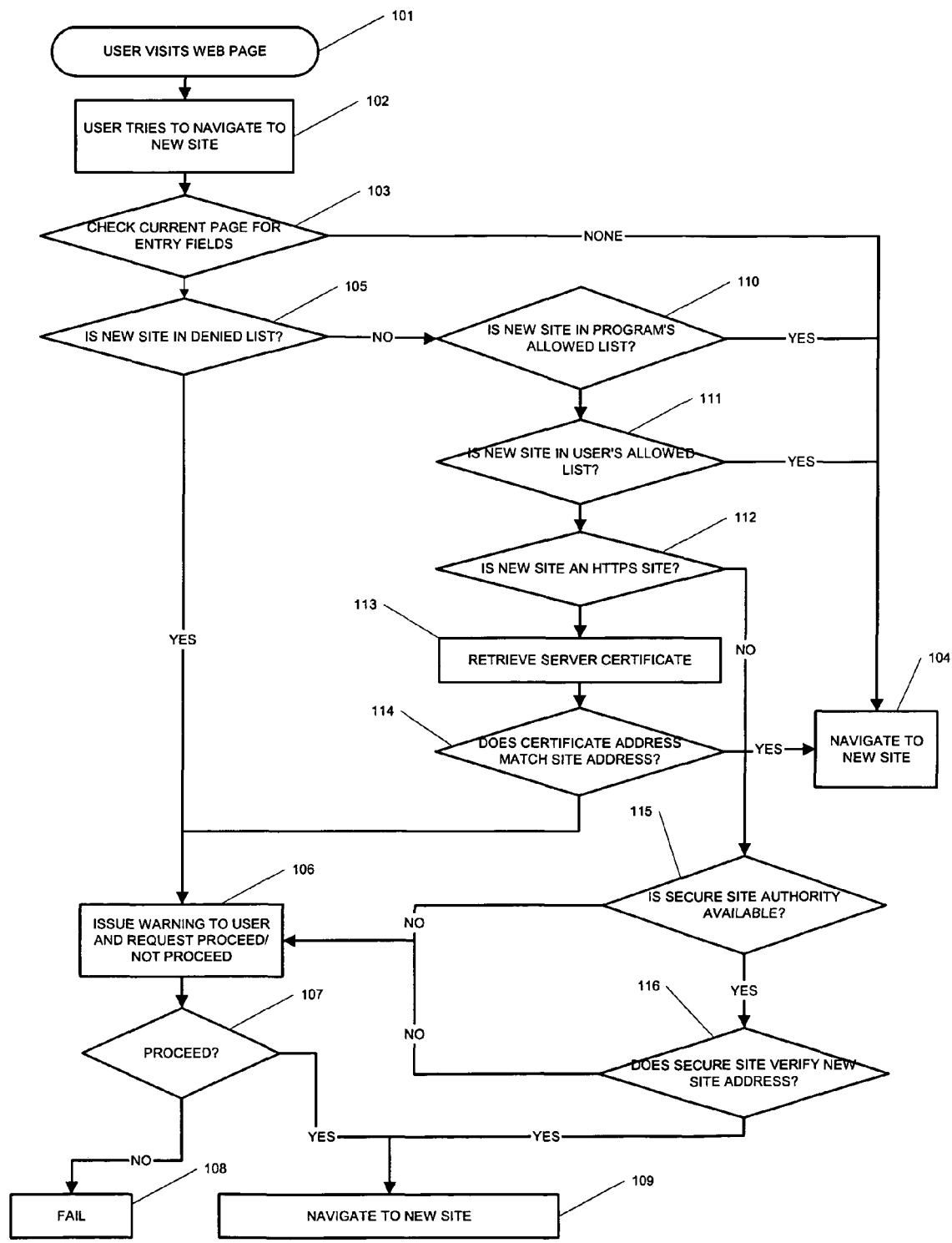
FIG. 1 is a flow diagram of the recognition and rejection process of an embodiment of the present invention.

This invention concerns a system or process for the detection and interception of submission of confidential information from a web browser to a website, whereby the identity of the target website will be authenticated using multiple authentication methods prior to any further action. The further action could be to allow or deny the information submission subject to a combination of the results of authentication.

To recap, the common methods of extracting confidential information from a user, these are:

Presenting the user with a link to a website which appears to be a genuine website known to the user. Typically this might be a replica of a bank site with a domain name that is only slightly different than the actual domain name of the bank, for instance a lower case "L" may be replaced with the number "1". At least some of the users will follow the link and be deceived enough to enter confidential information, typically for an internet banking account. The false replica will either echo the data to the real site and transfer the user at the first opportunity while retaining the entered data, or will simply provide no response, thus leading a user to assume the site is down. The link may even be set up so that the URL appears correct but has an associated script that actually connects to a different site.

Sending an email to a user that appears to originate from a trusted source, such as a bank, and that requests the user to click on a link that again leads to a website such as that referred to above.

Sending an email to a user with form fields to be filled in. Code associated with the form fields can send the information to virtually anywhere.

Overlaying legitimate entry fields in a browser with a separate window that carries equivalent entry fields. This process relies on a popup window that may have been triggered by embedded software downloaded from a supposedly innocuous site. The entry field overlaid may be the address bar of the browser and the software may only act when a known address is entered, such as PayPal, redirecting the user to a fake site in which they enter their confidential data. Alternatively, the entry fields overlaid may be the standard fields for login, and the data may be sent to a malicious address.

The current invention proposes a web-based detection system that verifies the legitimacy of every call to a web URL before it is sent. The legitimacy of the site to which the data is being sent is checked in several ways. The detection system preferably is implemented as a plug-in for the email or browser in use.

When a user sends data to a web site (i.e. every time any information is sent or any web page is queried) the current page, whether an HTML email or a web page in a browser is checked to see whether there was user input.

If user input exists, typically as form fields, a URL-checking process is begun.

Firstly, the plug-in consults an embedded "white" list of trusted web sites. If the URL being called is not on the white list, then the request is held and the user is informed that the user must authorise the request to this URL.

Secondly, the URL is compared with a user-generated list of trusted web sites. Again, if the URL being called is not on the list, the request is held and the user is informed. A decision by the user to proceed will also generate an offer to add the requested site to the user's list of trusted sites.

Thirdly, if the site being queried is a secure site (https), then the target website address is compared with the target website server security certificate. If they do not match, then again the request is held and the user is informed with a suitable message.

Fourthly, the address being queried may be queried at a web-based white list of legitimate addresses with authentication being supplied from a secure server in an encrypted document. If no record of the called site is held, the user is again notified that the request is suspect and a user decision awaited. Otherwise the request proceeds.

FIG. 1 shows a process, in accordance with an embodiment of the invention, implemented by a web browser plug-in in which a user visits a web page at 101, at 102 either clicks a link, submits a page or attempts to move to another website. At 103, the plug-in parses the current web page looking for text box entry fields within "<FORM>" fields. Such fields may be "<INPUT>" fields of several types. If no fields are found, the browser request is allowed at 104 and the browser redirects to the requested site.

If any such fields are found, the site to which navigation is being directed is checked at 105 against a denied "black" list which is normally associated with the plug-in. If the site is on the black list, a message is presented to the user at 106 stating that the site requested is on the black list and it is not recommended that the site be viewed because confidential data might be transferred. The user may make a decision to drop the request at 106 or to go to the site at 109.

If the site is not on the black list, a check is made at 110 to see if the site is on an allowed white list that is held by the plug-in. If it is, the browser is allowed to navigate to the new site. If it is not, then a check is made at 111 against a second white list that has been approved by the user. Again, if the site is on the list the browser redirection proceeds.

If the requested site is on neither list, then if the site is running on a Secure Sockets Layer protocol (https), the site certificate is requested from the secure site server at 113. If the site address matches the requested address at 115, then it is assumed that the site is satisfactory and the user is redirected. If no match is made, then the user is informed again at 106 with an appropriate message.

If the site is not an https site, an attempt is made to check with a "white-list server" on the internet whether the requested site address is satisfactory. The white-list server is checked for availability at 115 and, if present, a check is made at 116. Failing to match the white list again results in a message being provided to the user at 106, though if a match is found then the browser is redirected.

Figure 2:
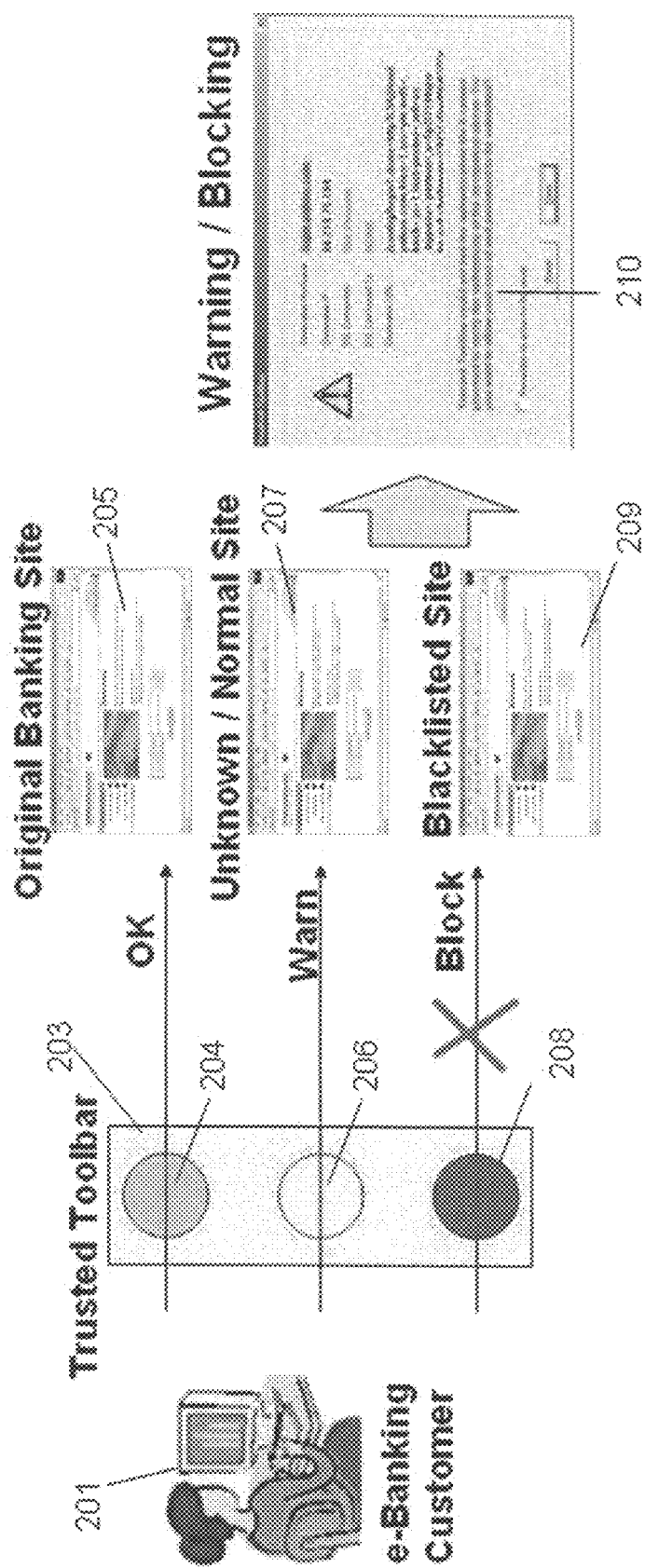
FIG. 2 is a schematic diagram representing use of an embodiment of the present invention.

FIG. 2 shows the typical examples of the color warnings provided on detection of various sites, and a typical warning message. These may be instigated from a toolbar in the browser, the toolbar being instigated by the plug-in. The toolbar may actively show the status of any current requests.

As shown in FIG. 2, after a user such as e-banking customer 201 attempts to access a bank website, trusted toolbar 203 may provide one of several responses. If the website is verified, green indication 204 is provided on trusted toolbar 203 to indicate that it is OK, and the user's browser proceeds to website 205. If the website cannot be verified and the user is to be given an opportunity to authorize the URL, yellow indication 206 is provided on trusted toolbar 203 to indicate a warning. Warning/blocking dialog 210 is presented to the user, and the user's browser proceeds to website 207 only if the user authorizes the URL. If the website cannot be verified and the user is not to be given an opportunity to authorize the URL, red indication 208 is provided on trusted toolbar 203 to indicate that it is blocked. Warning/blocking dialog 210 is presented to the user, and the user's browser does not proceed to website 209.

A system or method according to the invention is used in the verification that user data is not being sent to an unauthorised person who may use that information to carry out an action deleterious to the user, such as funds transfer. Preventing such a fund transfer has an economic benefit to the user.

Additionally, the modification to the browser or email package by addition of a plug-in provides a tool of greater utility. The present invention is therefore industrially applicable.

It is to be understood that even though numerous characteristics and advantages of the various embodiments of the present invention have been set forth in the foregoing description, together with details of the structure and functioning of various embodiments of the invention, this disclosure is illustrative only, and changes may be made in detail so long as the functioning of the invention is not adversely affected. For example, the particular order in which the checks are made may vary dependent on the particular application for which it is used without departure from the scope of the present invention.

The invention claimed is:

1. A method of controlling a submission of user-entered information in a web browser, comprising:
    (a) detecting when the user attempts to send a page request to navigate from a current web page to a different web address;
    (b) detecting data entry fields in the currently displayed page; and
    (c) if no data entry fields are detected, allowing a submission of the page request to the different web address, or
    (d) if data entry fields are detected; verifying that the different web address is either in an approved list of web addresses, or corresponds to a site certificate of a secure site before allowing a submission of the page request to the different web address; and allowing the submission of the page request to the different web address if it is verified or denying the submission of the page request to the different web address if it is not verified.

2. The method as claimed in claim 1, wherein if the different web address is not verified, the user is queried for verification.

3. The method as claimed in claim 2, wherein the user may add the different web address to the approved list of web addresses.

4. The method as claimed in claim 2, wherein the data entry fields are detected in the current web page by detecting web form fields of the text type.

5. The method as claimed in claim 1, wherein the approved, list of web addresses includes one or more of a user-approved list, an embedded approved list, or a web-based approved list.

6. The method as claimed in claim 5, wherein the web-based approved list is a list available from a secure server.

7. The method as claimed in claim 1, wherein the different web address is compared with a rejection black list.

8. The method as claimed in claim 1, wherein the secure site is a site using the Secure Sockets Layer protocol.

9. The method as claimed in claim 1, wherein the verifying results in degrees of verification and each degree is indicated to the user by a color indication.

10. A system for authenticating a web browser address comprising one or more computer-readable media having stored thereon a computer program comprising:
    (a) a web browser; and
    (b) a web browser plug-in,
    (c) wherein the plug-in intercepts any request to view a web page differing from a displayed web page, analyzing the displayed web page for data entry fields and,
        (1) if no data entry fields are detected, allowing a transmission of the request to view, or
        (2) if data entry fields are detected, comparing the requested web page address with previously authenticated addresses before allowing the transmission of the request to view, and allowing transmission of the request to view if the differing web page address is one of the previously authenticated addresses, or denying transmission of the request to view if the differing web page address is not one of the previously authenticated addresses.

11. The system as claimed in claim 10, wherein the authenticated addresses are held in lists and at least one list is embedded in the plug-in.

12. The system as claimed in claim 10, wherein the plug-in also provides rejection if a request matches a list of sites to be rejected.

13. The system as claimed in claim 10, wherein the authenticator indicates its active presence in the browser by displaying a toolbar.

14. The system as claimed in claim 13, wherein the toolbar indicates the status of current requests of web page addresses.

15. A system for authenticating a web browser address comprising a web browser plug-in comprising:
    (a) an interceptor which intercepts any request to view a web page differing from the current web page; and
    (b) an analyzer which analyses the current web page for data entry fields and,
        (1) if no data entry fields are detected, allows the request or
        (2) if data entry fields are detected, compares an address of the request with previously authenticated addresses before allowing the request,
    wherein if data entry fields are present, and the requested web page address matches one of the previously authenticated addresses, the plug-in allows the request or if data entry fields are present and the requested web page address does not match one previously authenticated addresses, the plug-in denies the request.

16. The system as claimed in claim 15, wherein if the requested web page address is not authenticated, the plug-in queries the user for authentication.

17. The system as claimed in claim 16, wherein the address analyser uses at least one of an address list internal to the plug-in, an address list associated with the browser, or an address list available from a web server.

18. The system as claimed in claim 15, wherein the plug-in interacts with the user via a browser toolbar.

19. A computer program product comprising
a non-transitory computer readable medium including instructions which are operable to control an internet browser to:
   (a) detect when the user attempts to send a page request to navigate from a current web page to a different web address;
   (b) detect data entry fields in the current web page; and
      (1) if data entry fields are not detected, allowing a submission of the page request to the different web address, or
      (2) if data entry fields are detected, verifying-that the different web address is either in an approved list of web addresses, or corresponds to a site certificate of a secure site before allowing the submission of the page request to the different web address; and allowing the submission of the page request to the different web address if it is verified or denying the submission of the page request to the different web address if it is not verified.

20. The computer program product as claimed in claim 19, wherein the instructions are present in the form of a browser plug-in.

\* \* \* \* \*